(12) United States Patent
Landberger et al.

(10) Patent No.: US 12,344,265 B2
(45) Date of Patent: Jul. 1, 2025

(54) SYSTEM AND METHOD FOR CONTROLLING AT LEAST ONE FUNCTION OF A RECREATIONAL VEHICLE

(71) Applicant: Dometic Sweden AB, Solna (SE)

(72) Inventors: Ulf Landberger, Spanga (SE); Stefan Henningsohn, Vällingby (SE); Purnendu Kumar, Järfälla (SE)

(73) Assignee: Dometic Sweden AB, Solna (SE)

( * ) Notice: Subject to any disclaimer, the term of this patent is extended or adjusted under 35 U.S.C. 154(b) by 115 days.

(21) Appl. No.: 18/245,321

(22) PCT Filed: Sep. 15, 2021

(86) PCT No.: PCT/EP2021/075390
§ 371 (c)(1),
(2) Date: Mar. 14, 2023

(87) PCT Pub. No.: WO2022/058390
PCT Pub. Date: Mar. 24, 2022

(65) Prior Publication Data
US 2023/0356739 A1    Nov. 9, 2023

(30) Foreign Application Priority Data
Sep. 18, 2020   (EP) ..................................... 20197022

(51) Int. Cl.
*B60W 50/14*   (2020.01)
*G05B 19/042*  (2006.01)

(52) U.S. Cl.
CPC ......... *B60W 50/14* (2013.01); *G05B 19/0428* (2013.01); *B60W 2050/146* (2013.01); *G05B 2219/2637* (2013.01)

(58) Field of Classification Search
None
See application file for complete search history.

(56) References Cited

U.S. PATENT DOCUMENTS

| | | | |
|---|---|---|---|
| 4,916,909 | A | 4/1990 | Mathur et al. |
| 5,424,720 | A | 6/1995 | Kirkpatrick |

(Continued)

FOREIGN PATENT DOCUMENTS

| | | |
|---|---|---|
| AT | 263982 T | 4/2004 |
| AT | 439486 T | 8/2009 |

(Continued)

OTHER PUBLICATIONS

US D887,373 S, 06/2020, Becker (withdrawn)

(Continued)

*Primary Examiner* — Kevin R Steckbauer
(74) *Attorney, Agent, or Firm* — Dinsmore & Shohl LLP (57) ABSTRACT

The present disclosure relates to a vehicle monitoring and control system and a method for controlling at least one function of a vehicle. For example, a Recreational Vehicle (RV) monitoring and control system and a method for controlling at least one function of a RV are proposed. The vehicle monitoring and control system comprises at least one controller. The at least one controller is configured to receive sensor input data from at least two different types of sensor units. The at least one controller is configured to process the received sensor input data into a combined sensor input data and to compare the combined sensor input data against at least one threshold. Based on a result of the comparison, the at least one controller is configured to control at least one function of the vehicle.

16 Claims, 4 Drawing Sheets

(56) References Cited

U.S. PATENT DOCUMENTS

| | | |
|---|---|---|
| 5,632,614 A | 5/1997 | Consadori et al. |
| D397,909 S | 9/1998 | Ashcraft et al. |
| 5,931,151 A | 8/1999 | Van Dore et al. |
| 6,134,906 A | 10/2000 | Eastman |
| 6,259,227 B1 | 7/2001 | Gherman et al. |
| 6,460,356 B1 | 10/2002 | Tao et al. |
| 6,591,622 B1 | 7/2003 | Gherman et al. |
| 6,729,144 B1 | 5/2004 | Kupferman |
| 6,856,820 B1 | 2/2005 | Kolls |
| 6,863,222 B2 | 3/2005 | Slifkin et al. |
| 6,929,061 B2 | 8/2005 | Lajeunesse |
| 7,082,380 B2 | 7/2006 | Wiebe et al. |
| 7,117,051 B2 | 10/2006 | Landry et al. |
| 7,131,282 B2 | 11/2006 | Karlsson et al. |
| 7,412,837 B2 | 8/2008 | Karisson et al. |
| 7,423,392 B2 | 9/2008 | Gill |
| 7,448,546 B2 | 11/2008 | Jung et al. |
| D588,479 S | 3/2009 | Giese |
| D604,305 S | 11/2009 | Anzures et al. |
| 7,707,845 B2 | 5/2010 | Bilodeau |
| 7,739,882 B2 | 6/2010 | Evans et al. |
| 7,849,699 B2 | 12/2010 | Allen |
| 8,307,667 B2 | 11/2012 | Rusignuolo et al. |
| 8,374,824 B2 | 2/2013 | Schwiers et al. |
| 8,461,958 B2 | 6/2013 | Saenz et al. |
| 8,539,783 B1 | 9/2013 | Bunch |
| 8,545,113 B2 | 10/2013 | Johnson et al. |
| 8,549,131 B2 | 10/2013 | Keyghobad et al. |
| 8,653,949 B2 | 2/2014 | Lee et al. |
| 8,960,563 B1 | 2/2015 | Perten et al. |
| 8,981,930 B2 | 3/2015 | Horstemeyer et al. |
| D738,355 S | 9/2015 | Smith et al. |
| 9,193,312 B2 | 11/2015 | Colella et al. |
| D756,333 S | 5/2016 | Smith et al. |
| D757,691 S | 5/2016 | Smith et al. |
| D761,232 S | 7/2016 | Smith et al. |
| D766,217 S | 9/2016 | Smith et al. |
| 9,454,897 B2 | 9/2016 | Cattermole et al. |
| D795,712 S | 8/2017 | Bergin et al. |
| 9,915,091 B2* | 3/2018 | Gantman ............... E05F 17/00 |
| D823,265 S | 7/2018 | Meda et al. |
| D834,961 S | 12/2018 | Bergin et al. |
| D839,318 S | 1/2019 | Meda et al. |
| D846,505 S | 4/2019 | Becker |
| D865,914 S | 11/2019 | Snyder |
| 10,675,941 B2 | 6/2020 | Williamson et al. |
| 10,696,129 B2 | 6/2020 | Berger |
| D893,436 S | 8/2020 | Becker |
| 10,810,806 B2* | 10/2020 | Petousis ............... H04W 4/44 |
| 10,941,955 B2 | 3/2021 | Heral |
| 11,194,319 B2* | 12/2021 | Cella ............... G06V 10/7784 |
| 11,239,774 B2 | 2/2022 | Becker |
| 11,254,183 B2 | 2/2022 | Peter et al. |
| D947,699 S | 4/2022 | Schuh et al. |
| 11,334,063 B2* | 5/2022 | Cella ............... G06Q 30/0278 |
| 11,643,116 B2* | 5/2023 | Gall ............... G01C 21/3461 |
| | | 701/25 |
| 11,926,269 B2* | 3/2024 | Gut ............... B60R 16/023 |
| 12,039,426 B2* | 7/2024 | Cella ............... H04B 17/309 |
| 2003/0070444 A1 | 4/2003 | Volker et al. |
| 2003/0164754 A1 | 9/2003 | Roseen |
| 2004/0178889 A1 | 9/2004 | Buckingham et al. |
| 2005/0141154 A1 | 6/2005 | Consadori et al. |
| 2006/0123807 A1 | 6/2006 | Sullivan et al. |
| 2007/0023180 A1 | 2/2007 | Komarek et al. |
| 2007/0028635 A1 | 2/2007 | Gleeson |
| 2008/0087663 A1 | 4/2008 | Mansbery et al. |
| 2008/0115513 A1 | 5/2008 | Unmack |
| 2008/0121729 A1 | 5/2008 | Gray |
| 2008/0299961 A1 | 12/2008 | Volker |
| 2009/0109004 A1 | 4/2009 | Van Alstyne |
| 2009/0139246 A1 | 6/2009 | Lifson et al. |
| 2010/0274604 A1 | 10/2010 | Crilly |
| 2012/0255317 A1 | 10/2012 | Leistner et al. |
| 2014/0148975 A1 | 5/2014 | Self et al. |
| 2014/0210593 A1 | 7/2014 | Cattermole et al. |
| 2014/0313055 A1 | 10/2014 | Warkentin et al. |
| 2015/0184442 A1* | 7/2015 | Gantman ............... E05F 15/71 |
| | | 701/49 |
| 2015/0198937 A1 | 7/2015 | Wait |
| 2015/0204561 A1* | 7/2015 | Sadwick ............... F24F 11/33 |
| | | 236/1 C |
| 2016/0144764 A1 | 5/2016 | Dutta et al. |
| 2016/0211985 A1 | 7/2016 | Castillo et al. |
| 2016/0214621 A1 | 7/2016 | Baalu et al. |
| 2017/0264224 A1 | 9/2017 | Becker |
| 2017/0372600 A1 | 12/2017 | Palin et al. |
| 2018/0134116 A1 | 5/2018 | Chen et al. |
| 2018/0147913 A1 | 5/2018 | Bergin |
| 2018/0191687 A1 | 7/2018 | Munafo |
| 2019/0003765 A1 | 1/2019 | Chen et al. |
| 2019/0128551 A1 | 5/2019 | Heral |
| 2019/0129407 A1* | 5/2019 | Cella ............... H02M 1/12 |
| 2020/0089211 A1* | 3/2020 | Cella ............... H04L 47/122 |
| 2020/0103892 A1* | 4/2020 | Cella ............... G05B 23/0286 |
| 2020/0217575 A1 | 7/2020 | Thelin et al. |
| 2020/0298655 A1 | 9/2020 | Williamson et al. |
| 2020/0313871 A1 | 10/2020 | Troia et al. |
| 2020/0338951 A1 | 10/2020 | Paci et al. |
| 2020/0377042 A1* | 12/2020 | Sorensen ............... H02J 13/00 |
| 2021/0142601 A1 | 5/2021 | Schoenfelder et al. |
| 2021/0146961 A1* | 5/2021 | Gall ............... B60W 60/0015 |
| 2021/0229529 A1 | 7/2021 | Cai et al. |
| 2021/0237664 A1* | 8/2021 | Gut ............... G07C 5/008 |
| 2022/0114847 A1 | 4/2022 | Emde et al. |
| 2022/0114853 A1 | 4/2022 | Emde et al. |
| 2022/0148352 A1 | 5/2022 | Schuh |
| 2022/0410828 A1 | 12/2022 | Schuh et al. |
| 2023/0111829 A1* | 4/2023 | Cella ............... G06F 18/2178 |
| | | 702/188 |
| 2023/0194115 A1* | 6/2023 | Malik ............... F24F 11/63 |
| | | 700/276 |
| 2023/0356739 A1* | 11/2023 | Landberger ............ B60W 50/14 |

FOREIGN PATENT DOCUMENTS

| | | |
|---|---|---|
| AT | 483596 T | 10/2010 |
| AT | 504462 T | 4/2011 |
| AU | 2001280374 A1 | 5/2002 |
| AU | 2003217095 A1 | 9/2003 |
| AU | 2007200788 A1 | 9/2007 |
| AU | 2002335708 B2 | 4/2008 |
| AU | 2006259965 B2 | 6/2009 |
| AU | 2005239637 B2 | 12/2010 |
| AU | 2014246608 A1 | 3/2016 |
| AU | 1087016 S | 4/2016 |
| AU | 1175116 S | 5/2016 |
| AU | 201710975 S | 3/2017 |
| AU | 201710976 S | 3/2017 |
| AU | 1280417 S | 5/2017 |
| AU | 201712767 S | 5/2017 |
| AU | 201811509 S | 4/2018 |
| AU | 201811512 S | 4/2018 |
| AU | 2019284128 A1 | 7/2020 |
| AU | 2017364256 B2 | 2/2022 |
| AU | 2017222698 B2 | 6/2022 |
| AU | 2021343247 A1 | 3/2023 |
| CA | 2572005 A1 | 8/2007 |
| CA | 2578651 A1 | 8/2007 |
| CA | 2528368 C | 3/2011 |
| CA | 167369 S | 12/2016 |
| CA | 170638 S | 12/2016 |
| CA | 2948710 A1 | 9/2017 |
| CA | 174706 S | 5/2018 |
| CA | 179312 S | 5/2018 |
| CN | 2420532 Y | 2/2001 |
| CN | 1299034 A | 6/2001 |
| CN | 2434623 Y | 6/2001 |
| CN | 2524157 | 12/2002 |
| CN | 1116579 | 7/2003 |
| CN | 1475763 | 2/2004 |
| CN | 1178037 C | 12/2004 |
| CN | 1570929 A | 1/2005 |

(56) References Cited

FOREIGN PATENT DOCUMENTS

| | | | |
|---|---|---|---|
| CN | 1761318 | A | 4/2006 |
| CN | 1763450 | A | 4/2006 |
| CN | 2769742 | Y | 4/2006 |
| CN | 2780132 | Y | 5/2006 |
| CN | 2811877 | Y | 8/2006 |
| CN | 1828186 | A | 9/2006 |
| CN | 2829654 | Y | 10/2006 |
| CN | 2849539 | Y | 12/2006 |
| CN | 1888750 | A | 1/2007 |
| CN | 1936533 | A | 3/2007 |
| CN | 2878997 | Y | 3/2007 |
| CN | 2906406 | Y | 5/2007 |
| CN | 101063586 | A | 10/2007 |
| CN | 200961918 | Y | 10/2007 |
| CN | 101074816 | A | 11/2007 |
| CN | 201000370 | Y | 1/2008 |
| CN | 201015999 | Y | 2/2008 |
| CN | 201028884 | Y | 2/2008 |
| CN | 100373116 | C | 3/2008 |
| CN | 100380075 | C | 4/2008 |
| CN | 101153758 | A | 4/2008 |
| CN | 201066217 | Y | 5/2008 |
| CN | 100397004 | C | 6/2008 |
| CN | 100398956 | C | 7/2008 |
| CN | 101245936 | A | 8/2008 |
| CN | 101245957 | A | 8/2008 |
| CN | 100417880 | C | 9/2008 |
| CN | 101266069 | A | 9/2008 |
| CN | 201129824 | | 10/2008 |
| CN | 201129825 | | 10/2008 |
| CN | 201149349 | | 11/2008 |
| CN | 201163244 | | 12/2008 |
| CN | 201166753 | | 12/2008 |
| CN | 201170678 | | 12/2008 |
| CN | 101368771 | | 2/2009 |
| CN | 201191043 | | 2/2009 |
| CN | 201196458 | | 2/2009 |
| CN | 201209986 | | 3/2009 |
| CN | 201230319 | | 4/2009 |
| CN | 101435604 | A | 5/2009 |
| CN | 201233076 | | 5/2009 |
| CN | 201237396 | Y | 5/2009 |
| CN | 101476563 | A | 7/2009 |
| CN | 101498933 | A | 8/2009 |
| CN | 201297694 | Y | 8/2009 |
| CN | 201306900 | Y | 9/2009 |
| CN | 201348340 | Y | 11/2009 |
| CN | 201348413 | Y | 11/2009 |
| CN | 100575078 | C | 12/2009 |
| CN | 201363279 | Y | 12/2009 |
| CN | 201363838 | Y | 12/2009 |
| CN | 201363859 | Y | 12/2009 |
| CN | 201363949 | Y | 12/2009 |
| CN | 101665037 | A | 3/2010 |
| CN | 101691863 | A | 4/2010 |
| CN | 201486856 | U | 5/2010 |
| CN | 201503133 | U | 6/2010 |
| CN | 201539404 | U | 8/2010 |
| CN | 201541754 | U | 8/2010 |
| CN | 201546958 | U | 8/2010 |
| CN | 201575541 | U | 9/2010 |
| CN | 201589475 | U | 9/2010 |
| CN | 1928445 | B | 10/2010 |
| CN | 101251290 | B | 10/2010 |
| CN | 101866173 | A | 10/2010 |
| CN | 101363640 | B | 11/2010 |
| CN | 201621800 | U | 11/2010 |
| CN | 201622078 | U | 11/2010 |
| CN | 201666251 | U | 12/2010 |
| CN | 201672642 | U | 12/2010 |
| CN | 201748559 | U | 2/2011 |
| CN | 201749468 | U | 2/2011 |
| CN | 101435616 | B | 4/2011 |
| CN | 101464032 | B | 4/2011 |
| CN | 102012146 | A | 4/2011 |
| CN | 201820291 | U | 5/2011 |
| CN | 101619882 | B | 6/2011 |
| CN | 201849367 | U | 6/2011 |
| CN | 201852224 | U | 6/2011 |
| CN | 102118435 | A | 7/2011 |
| CN | 201908838 | U | 7/2011 |
| CN | 101586562 | B | 8/2011 |
| CN | 102147125 | A | 8/2011 |
| CN | 102151092 | A | 8/2011 |
| CN | 102156466 | A | 8/2011 |
| CN | 201923534 | U | 8/2011 |
| CN | 201948819 | U | 8/2011 |
| CN | 101435617 | B | 9/2011 |
| CN | 102192569 | A | 9/2011 |
| CN | 201964703 | U | 9/2011 |
| CN | 201976127 | U | 9/2011 |
| CN | 201982375 | U | 9/2011 |
| CN | 102213518 | A | 10/2011 |
| CN | 102235717 | A | 11/2011 |
| CN | 102252369 | A | 11/2011 |
| CN | 202050251 | U | 11/2011 |
| CN | 202083072 | U | 12/2011 |
| CN | 102338428 | A | 2/2012 |
| CN | 102345951 | A | 2/2012 |
| CN | 102355628 | A | 2/2012 |
| CN | 102364319 | A | 2/2012 |
| CN | 202177186 | U | 3/2012 |
| CN | 101556069 | B | 4/2012 |
| CN | 202186048 | U | 4/2012 |
| CN | 101443719 | B | 5/2012 |
| CN | 102444957 | A | 5/2012 |
| CN | 102466296 | A | 5/2012 |
| CN | 102478335 | A | 5/2012 |
| CN | 101275800 | B | 6/2012 |
| CN | 101788172 | B | 7/2012 |
| CN | 101825087 | B | 7/2012 |
| CN | 101846381 | B | 7/2012 |
| CN | 101886852 | B | 7/2012 |
| CN | 102042724 | B | 7/2012 |
| CN | 102536819 | A | 7/2012 |
| CN | 102564052 | A | 7/2012 |
| CN | 102588285 | A | 7/2012 |
| CN | 202287095 | U | 7/2012 |
| CN | 202305190 | U | 7/2012 |
| CN | 102032643 | B | 8/2012 |
| CN | 102620517 | A | 8/2012 |
| CN | 102650479 | A | 8/2012 |
| CN | 101988839 | B | 9/2012 |
| CN | 102679490 | A | 9/2012 |
| CN | 102691660 | A | 9/2012 |
| CN | 202431521 | U | 9/2012 |
| CN | 202431522 | U | 9/2012 |
| CN | 202442411 | U | 9/2012 |
| CN | 202452784 | U | 9/2012 |
| CN | 102705237 | A | 10/2012 |
| CN | 202470336 | U | 10/2012 |
| CN | 202475495 | U | 10/2012 |
| CN | 202476017 | U | 10/2012 |
| CN | 202501706 | U | 10/2012 |
| CN | 202503538 | U | 10/2012 |
| CN | 202511560 | U | 10/2012 |
| CN | 101988717 | B | 11/2012 |
| CN | 102765563 | B | 11/2012 |
| CN | 202532335 | U | 11/2012 |
| CN | 202563323 | U | 11/2012 |
| CN | 102809202 | B | 12/2012 |
| CN | 102840716 | A | 12/2012 |
| CN | 202568984 | U | 12/2012 |
| CN | 202581676 | U | 12/2012 |
| CN | 202598971 | U | 12/2012 |
| CN | 202613597 | U | 12/2012 |
| CN | 202613835 | U | 12/2012 |
| CN | 202630282 | U | 12/2012 |
| CN | 102853624 | A | 1/2013 |
| CN | 102878663 | A | 1/2013 |
| CN | 102889748 | A | 1/2013 |
| CN | 202648236 | U | 1/2013 |
| CN | 202692596 | U | 1/2013 |
| CN | 202708102 | U | 1/2013 |

(56) References Cited

FOREIGN PATENT DOCUMENTS

| | | |
|---|---|---|
| CN | 202709553 U | 1/2013 |
| CN | 102914102 A | 2/2013 |
| CN | 202734071 U | 2/2013 |
| CN | 202734420 U | 2/2013 |
| CN | 202789544 U | 3/2013 |
| CN | 202835631 U | 3/2013 |
| CN | 102116515 B | 4/2013 |
| CN | 103032933 A | 4/2013 |
| CN | 202851355 U | 4/2013 |
| CN | 202868893 U | 4/2013 |
| CN | 202868894 U | 4/2013 |
| CN | 202868919 U | 4/2013 |
| CN | 202868920 U | 4/2013 |
| CN | 103105204 A | 5/2013 |
| CN | 202916629 U | 5/2013 |
| CN | 203771639 U | 5/2013 |
| CN | 103162469 A | 6/2013 |
| CN | 103177339 A | 6/2013 |
| CN | 202967270 U | 6/2013 |
| CN | 202993659 U | 6/2013 |
| CN | 202993694 U | 6/2013 |
| CN | 103188655 A | 7/2013 |
| CN | 103196274 A | 7/2013 |
| CN | 203053481 U | 7/2013 |
| CN | 203068889 U | 7/2013 |
| CN | 103245007 A | 8/2013 |
| CN | 103245031 A | 8/2013 |
| CN | 103245033 A | 8/2013 |
| CN | 203116393 U | 8/2013 |
| CN | 203163367 U | 8/2013 |
| CN | 203164715 U | 8/2013 |
| CN | 103292572 A | 9/2013 |
| CN | 103322766 A | 9/2013 |
| CN | 203203288 U | 9/2013 |
| CN | 203203289 U | 9/2013 |
| CN | 203203317 U | 9/2013 |
| CN | 103335485 A | 10/2013 |
| CN | 103375870 A | 10/2013 |
| CN | 103375871 A | 10/2013 |
| CN | 103375935 A | 10/2013 |
| CN | 203310199 U | 11/2013 |
| CN | 103471297 A | 12/2013 |
| CN | 203324857 U | 12/2013 |
| CN | 203366082 U | 12/2013 |
| CN | 103512087 A | 1/2014 |
| CN | 103528142 A | 1/2014 |
| CN | 103574771 A | 2/2014 |
| CN | 103574772 A | 2/2014 |
| CN | 103578257 A | 2/2014 |
| CN | 103604272 A | 2/2014 |
| CN | 103616863 A | 3/2014 |
| CN | 103629740 A | 3/2014 |
| CN | 103629866 A | 3/2014 |
| CN | 103671119 A | 3/2014 |
| CN | 203489530 U | 3/2014 |
| CN | 103691835 A | 4/2014 |
| CN | 103745359 A | 4/2014 |
| CN | 203518373 U | 4/2014 |
| CN | 203550232 U | 4/2014 |
| CN | 203550407 U | 4/2014 |
| CN | 203561118 U | 4/2014 |
| CN | 203566105 U | 4/2014 |
| CN | 102705939 B | 5/2014 |
| CN | 103776090 A | 5/2014 |
| CN | 103776212 A | 5/2014 |
| CN | 103791684 A | 5/2014 |
| CN | 103807987 A | 5/2014 |
| CN | 103808012 A | 5/2014 |
| CN | 203586483 U | 5/2014 |
| CN | 203586488 U | 5/2014 |
| CN | 103836761 A | 6/2014 |
| CN | 103854344 A | 6/2014 |
| CN | 103884152 A | 6/2014 |
| CN | 203633039 U | 6/2014 |
| CN | 203664542 U | 6/2014 |
| CN | 103906529 A | 7/2014 |
| CN | 103925677 A | 7/2014 |
| CN | 103925678 A | 7/2014 |
| CN | 103925682 A | 7/2014 |
| CN | 103925753 A | 7/2014 |
| CN | 103925755 A | 7/2014 |
| CN | 103940053 A | 7/2014 |
| CN | 103940139 A | 7/2014 |
| CN | 103940157 A | 7/2014 |
| CN | 103954082 A | 7/2014 |
| CN | 103954087 A | 7/2014 |
| CN | 203706293 U | 7/2014 |
| CN | 203719239 U | 7/2014 |
| CN | 103968620 A | 8/2014 |
| CN | 103968631 A | 8/2014 |
| CN | 103968636 A | 8/2014 |
| CN | 103968963 A | 8/2014 |
| CN | 104006445 A | 8/2014 |
| CN | 104006597 A | 8/2014 |
| CN | 203796564 U | 8/2014 |
| CN | 104033996 A | 9/2014 |
| CN | 104048406 A | 9/2014 |
| CN | 104048448 A | 9/2014 |
| CN | 104050784 A | 9/2014 |
| CN | 203833232 U | 9/2014 |
| CN | 203837349 U | 9/2014 |
| CN | 203837396 U | 9/2014 |
| CN | 104089378 A | 10/2014 |
| CN | 104101124 A | 10/2014 |
| CN | 104101125 A | 10/2014 |
| CN | 104110740 A | 10/2014 |
| CN | 104121174 A | 10/2014 |
| CN | 104122463 A | 10/2014 |
| CN | 203867902 U | 10/2014 |
| CN | 203908094 U | 10/2014 |
| CN | 203908147 U | 10/2014 |
| CN | 203908786 U | 10/2014 |
| CN | 102958751 B | 11/2014 |
| CN | 104134292 A | 11/2014 |
| CN | 104139226 A | 11/2014 |
| CN | 104142001 A | 11/2014 |
| CN | 104154802 A | 11/2014 |
| CN | 104155964 A | 11/2014 |
| CN | 104165443 A | 11/2014 |
| CN | 104165483 A | 11/2014 |
| CN | 203928142 U | 11/2014 |
| CN | 203964436 U | 11/2014 |
| CN | 203964468 U | 11/2014 |
| CN | 203965900 U | 11/2014 |
| CN | 104180442 A | 12/2014 |
| CN | 104197632 A | 12/2014 |
| CN | 104199358 A | 12/2014 |
| CN | 104214887 A | 12/2014 |
| CN | 104215007 A | 12/2014 |
| CN | 104219289 A | 12/2014 |
| CN | 104236023 A | 12/2014 |
| CN | 104236198 A | 12/2014 |
| CN | 104236244 A | 12/2014 |
| CN | 104251591 A | 12/2014 |
| CN | 204006509 U | 12/2014 |
| CN | 204029050 U | 12/2014 |
| CN | 204044653 U | 12/2014 |
| CN | 204055526 U | 12/2014 |
| CN | 204063308 U | 12/2014 |
| CN | 204063678 U | 12/2014 |
| CN | 104266318 A | 1/2015 |
| CN | 104266423 A | 1/2015 |
| CN | 104279150 A | 1/2015 |
| CN | 104279716 A | 1/2015 |
| CN | 104279836 A | 1/2015 |
| CN | 104289021 A | 1/2015 |
| CN | 104296348 A | 1/2015 |
| CN | 104296489 A | 1/2015 |
| CN | 104315671 A | 1/2015 |
| CN | 204100662 U | 1/2015 |
| CN | 204115391 U | 1/2015 |
| CN | 104329831 A | 2/2015 |
| CN | 104344595 A | 2/2015 |
| CN | 104374044 A | 2/2015 |

(56) References Cited

FOREIGN PATENT DOCUMENTS

| | | |
|---|---|---|
| CN | 104374055 A | 2/2015 |
| CN | 104374117 A | 2/2015 |
| CN | 104374159 A | 2/2015 |
| CN | 104374161 A | 2/2015 |
| CN | 104374162 A | 2/2015 |
| CN | 204141931 U | 2/2015 |
| CN | 204143491 U | 2/2015 |
| CN | 204177417 U | 2/2015 |
| CN | 204178470 U | 2/2015 |
| CN | 104406271 A | 3/2015 |
| CN | 104422065 A | 3/2015 |
| CN | 104422198 A | 3/2015 |
| CN | 104422217 A | 3/2015 |
| CN | 104456846 A | 3/2015 |
| CN | 104457048 A | 3/2015 |
| CN | 104457072 A | 3/2015 |
| CN | 104457130 A | 3/2015 |
| CN | 104457132 A | 3/2015 |
| CN | 104467148 A | 3/2015 |
| CN | 204187779 U | 3/2015 |
| CN | 204202120 U | 3/2015 |
| CN | 104482712 A | 4/2015 |
| CN | 104501483 A | 4/2015 |
| CN | 104503309 A | 4/2015 |
| CN | 104515245 A | 4/2015 |
| CN | 104534618 A | 4/2015 |
| CN | 204270404 U | 4/2015 |
| CN | 204291654 U | 4/2015 |
| CN | 105444510 A | 3/2016 |
| CN | 304444504 S | 1/2018 |
| CN | 210441529 U | 5/2020 |
| CN | 114517990 A | 5/2022 |
| DE | 10150819 A1 | 4/2003 |
| DE | 10161576 A1 | 6/2003 |
| DE | 69916310 | 5/2004 |
| DE | 202006010816 U1 | 2/2007 |
| DE | 202006020319 U1 | 7/2008 |
| DE | 60328750 | 9/2009 |
| DE | 202010009418 U1 | 11/2010 |
| DE | 602007009584 | 11/2010 |
| DE | 60336637 | 5/2011 |
| DE | 112017000915 T5 | 10/2018 |
| DE | 102017214941 A1 | 2/2019 |
| DE | 112017005541 T5 | 8/2019 |
| DE | 102019200063 A1 | 7/2020 |
| DE | 112018005002 T5 | 7/2020 |
| DE | 112020000798 T5 | 12/2021 |
| DK | 1413694 T3 | 11/2009 |
| DK | 1826041 T3 | 1/2011 |
| EP | 881443 A1 | 12/1998 |
| EP | 954083 A2 | 11/1999 |
| EP | 1304608 A1 | 4/2003 |
| EP | 1378981 A2 | 1/2004 |
| EP | 1127301 B1 | 4/2004 |
| EP | 1378981 A3 | 11/2006 |
| EP | 1826041 A1 | 8/2007 |
| EP | 1226394 B1 | 9/2007 |
| EP | 1879367 A1 | 1/2008 |
| EP | 2056534 | 5/2009 |
| EP | 1478531 B1 | 4/2011 |
| EP | 2390601 A1 | 11/2011 |
| EP | 2769275 A4 | 4/2016 |
| EP | 2903859 B1 | 12/2017 |
| EP | 2462395 B1 | 1/2018 |
| EP | 3436752 A4 | 2/2020 |
| EP | 3910261 A4 | 11/2021 |
| EP | 3971661 A1 * | 3/2022 ............ B60W 50/14 |
| EP | 3971691 A1 | 3/2022 |
| EP | 3972314 A1 | 3/2022 |
| GB | 2399887 A | 9/2004 |
| JP | 2000357146 A | 12/2000 |
| JP | 2001183043 A | 7/2001 |
| JP | 2001208463 A | 8/2001 |
| JP | 2002092120 A | 3/2002 |
| JP | 2002092307 A | 3/2002 |
| JP | 2002162146 A | 6/2002 |
| JP | 2002228154 A | 8/2002 |
| JP | 2002236798 A | 8/2002 |
| JP | 2002295936 A | 10/2002 |
| JP | 2002295939 A | 10/2002 |
| JP | 2002295960 A | 10/2002 |
| JP | 2002295961 A | 10/2002 |
| JP | 2002342564 | 11/2002 |
| JP | 2003022364 | 1/2003 |
| JP | 2003090673 | 3/2003 |
| JP | 2003162243 | 6/2003 |
| JP | 2003207260 | 7/2003 |
| JP | 2003242343 | 8/2003 |
| JP | 2004005027 | 1/2004 |
| JP | 2004086684 | 3/2004 |
| JP | 2004259145 A | 9/2004 |
| JP | 2005098560 A | 4/2005 |
| JP | 2005101846 A | 4/2005 |
| JP | 2005164054 A | 6/2005 |
| JP | 2005284611 A | 10/2005 |
| JP | 2005293382 A | 10/2005 |
| JP | 2005311864 A | 11/2005 |
| JP | 2006011930 A | 1/2006 |
| JP | 2006250510 A | 9/2006 |
| JP | 2007046833 A | 2/2007 |
| JP | 2013238345 | 11/2013 |
| JP | 2014209053 A | 11/2014 |
| KR | 20000030798 A | 6/2000 |
| KR | 20000071913 A | 12/2000 |
| KR | 20010077246 A | 8/2001 |
| KR | 20010077303 A | 8/2001 |
| KR | 20010094360 A | 11/2001 |
| KR | 20010094428 A | 11/2001 |
| KR | 20010105113 A | 11/2001 |
| KR | 20020004925 A | 1/2002 |
| KR | 20020009140 A | 2/2002 |
| KR | 20020009141 A | 2/2002 |
| KR | 20020013125 A | 2/2002 |
| KR | 20020027722 A | 4/2002 |
| KR | 20020055514 A | 7/2002 |
| KR | 100373092 | 2/2003 |
| KR | 100373093 | 2/2003 |
| KR | 20030016739 | 3/2003 |
| KR | 100379416 | 4/2003 |
| KR | 100381168 | 4/2003 |
| KR | 20030075692 | 9/2003 |
| KR | 100400464 | 10/2003 |
| KR | 100403021 | 10/2003 |
| KR | 20040021305 | 3/2004 |
| KR | 20040029884 A | 4/2004 |
| KR | 20040032649 A | 4/2004 |
| KR | 100429617 B1 | 5/2004 |
| KR | 100432721 B1 | 5/2004 |
| KR | 100437057 B1 | 6/2004 |
| KR | 100457558 B1 | 11/2004 |
| KR | 100457559 B1 | 11/2004 |
| KR | 100471448 B1 | 3/2005 |
| KR | 100476448 B1 | 3/2005 |
| KR | 100484814 B1 | 4/2005 |
| KR | 100487763 B1 | 5/2005 |
| KR | 20050054716 A | 6/2005 |
| KR | 20050058799 A | 6/2005 |
| KR | 20050059883 A | 6/2005 |
| KR | 20050077657 A | 8/2005 |
| KR | 20050078301 A | 8/2005 |
| KR | 20050110147 A | 11/2005 |
| KR | 100535675 B1 | 12/2005 |
| KR | 100565482 B1 | 3/2006 |
| KR | 100593641 B1 | 6/2006 |
| KR | 100600741 B1 | 7/2006 |
| KR | 20060089854 A | 8/2006 |
| KR | 20060117703 A | 11/2006 |
| KR | 20060119580 A | 11/2006 |
| KR | 20060120799 A | 11/2006 |
| KR | 100656394 B1 | 12/2006 |
| KR | 100656400 B1 | 12/2006 |
| KR | 100657926 B1 | 12/2006 |
| KR | 100657927 B1 | 12/2006 |
| KR | 100673435 B1 | 1/2007 |

(56) References Cited

FOREIGN PATENT DOCUMENTS

| | | | |
|---|---|---|---|
| KR | 20070012991 A | 1/2007 | |
| KR | 100676764 B1 | 2/2007 | |
| KR | 20070027180 A | 3/2007 | |
| KR | 20070053510 A | 5/2007 | |
| KR | 20070074863 A | 7/2007 | |
| KR | 100745804 B1 | 8/2007 | |
| KR | 20080029408 A | 4/2008 | |
| KR | 20080037129 A | 4/2008 | |
| KR | 100832492 B1 | 5/2008 | |
| KR | 20080060910 A | 7/2008 | |
| KR | 20080076381 A | 8/2008 | |
| KR | 20090045596 | 5/2009 | |
| KR | 20090047724 A | 5/2009 | |
| KR | 100934001 B1 | 12/2009 | |
| KR | 100950734 B1 | 3/2010 | |
| KR | 100975938 B1 | 8/2010 | |
| KR | 100982260 B1 | 9/2010 | |
| KR | 101028075 B1 | 4/2011 | |
| KR | 101028502 B1 | 4/2011 | |
| KR | 101031844 B1 | 5/2011 | |
| KR | 20110050764 A | 5/2011 | |
| KR | 20110067824 A | 6/2011 | |
| KR | 20110124082 A | 11/2011 | |
| KR | 20130094047 A | 8/2013 | |
| KR | 20140000081 A | 1/2014 | |
| KR | 20140026975 A | 3/2014 | |
| KR | 20150051514 A | 5/2015 | |
| KR | 20150052690 A | 5/2015 | |
| MX | 2007002196 A | 11/2008 | |
| NO | 2014014862 A2 | 1/2014 | |
| SE | 202073 L | 1/2004 | |
| TW | 200301047 | 6/2003 | |
| TW | 593950 B | 6/2004 | |
| TW | 201309059 A | 2/2013 | |
| TW | 202212945 A * | 4/2022 | ............ F24F 11/63 |
| WO | 03072378 A8 | 5/2004 | |
| WO | 2012122390 A2 | 9/2012 | |
| WO | 2013189183 A1 | 12/2013 | |
| WO | 2014016212 A1 | 1/2014 | |
| WO | WO-2014014862 A2 * | 1/2014 | ......... B60H 1/00735 |
| WO | WO-2014014862 A3 * | 3/2014 | ......... B60H 1/00735 |
| WO | 2014106060 A1 | 7/2014 | |
| WO | 2014183437 A1 | 11/2014 | |
| WO | 2014205243 A1 | 12/2014 | |
| WO | 2015058421 A1 | 4/2015 | |
| WO | WO-2015200730 A1 * | 12/2015 | ............ A61M 21/02 |
| WO | 2016000041 A1 | 1/2016 | |
| WO | WO2016029525 A1 | 3/2016 | |
| WO | 2018082168 A1 | 5/2018 | |
| WO | 2018096127 A1 | 5/2018 | |
| WO | 2019038023 A1 | 2/2019 | |
| WO | 2019082168 A1 | 5/2019 | |
| WO | 2020183367 A1 | 9/2020 | |
| WO | 2020183368 A1 | 9/2020 | |
| WO | 2022058391 A1 | 3/2022 | |
| WO | WO2022058389 A1 | 3/2022 | |
| WO | WO-2022058390 A1 * | 3/2022 | ............ B60W 50/14 |
| WO | WO2022081206 A1 | 4/2022 | |
| WO | WO2022081207 A1 | 4/2022 | |
| WO | WO2022105851 A1 | 5/2022 | |
| WO | WO-2024064927 A1 * | 3/2024 | ............ G05B 15/02 |

OTHER PUBLICATIONS

Office Action for Germany Patent Application No. 102017214941.8 mailed on Nov. 2, 2023.
ISA/European Patent Office; International Search Report and Written Opinion for PCT/EP2021/075390 mailed Dec. 20, 2021.
"STIIC—Smart Touch Integrated Intelligence Control," retreived from internet URL: https://citimarinestore.com/en/dometic-marine-air-conditioner-parts/4748-stiic-smart-touch-integrated-intelligence-control-263400309.html on Dec. 12, 2018, pp. 2.
International Preliminary Report on Patentability Issued in PCT Application No. PCT/EP2021/075389 mailed on Mar. 30, 2023.
International Preliminary Report on Patentability Issued in PCT Application No. PCT/EP2021/075390 mailed on Mar. 30, 2023.
International Preliminary Report on Patentability Issued in PCT Application No. PCT/EP2021/075391 mailed on Mar. 30, 2023.
Notice of Allowance issued in U.S. Appl. No. 17/673,080 mailed on Sep. 28, 2023.
Corrected Notice of Allowability issued in U.S. Appl. No. 17/673,080 mailed on Oct. 4, 2023.
Office Action issued in EP Application No. 20197019.1 mailed on Apr. 26, 2024.
Office Action issued in EP Application No. 20197023.3 mailed on Oct. 24, 2023.
Office Action issued in EP Application No. 20197022.5 mailed on Jan. 19, 2024.
"Understanding : On/Off, Floating, Modulating/Proportional Control", retreived from internet URL: https://controltrends.org/by-industry/commercial-hvac/03/understanding-on-off-floating-modulatingproportional-control/, on Jan. 23, 2019, pp. 2, paragraph 3.
"Starting up the Truma iNet System," truma iNet System, pp. 1-8 (2015).
Ferrill, B., et al., "Swipe to Patent: Design Patents in the Age of User Interfaces," Tech Crunch, retreived from internet URL: https://techcrunch.com/2015/08/03/swipe-to-patent-design-patents-in-the-age-of-user-interfaces/, on Dec. 12, 2018, pp. 23.
International Search Report and Written Opinion for International Application No. PCT/IB2018/058414, mailed on Jan. 31, 2019.
U.S. Appl. No. 62/578,350, filed Oct. 27, 2017 entitled "Systems, Methods, and Apparatuses for Providing Communications Between Climate Control Devices in a Recreational Vehicle".
International Search Report and Written Opinion for International Application No. PCT/EP2018/070390, mailed on Sep. 21, 2018.
US Utility U.S. Appl. No. 16/172,253 entitled "Systems, Methods, and Apparatuses for Providing Communications Between Climate Control Devices in a Recreational Vehicle" filed Oct. 26, 2018.
U.S. national stage U.S. Appl. No. 16/641,581 entitled "Recreational Vehicle, Cooling Device, Controlling System and Method for Controlling the Cooling Device" filed Feb. 24, 2020.
Non Final office Action for U.S. Appl. No. 16/172,253, Mailed on Feb. 12, 2020.
Office Action for Germany Patent Application No. 102017214941.8 mailed on Jan. 31, 2020.
Bochner, B., "Digitization in the Mobile Home—Mobile tour into the digital future," URL: https://www.promobil.de/zubehoer/mobil-tour-in-die-digi-zukunft-digitale-kofortzone.
Heinz, D.S., "Bus Technology in the Camper—promobil explains the complex electronics," URL: https://www.promobil.de/werkstatt/elektronik-im-wohnmobil-bus-technik-und-apps.
DE Application No. 112018005002.5 filed Apr. 24, 2020 entitled "Systems, Methods, and Apparatuses for Providing Communications Between Climate Control Devices in a Recreational Vehicle".
Non Final office Action for U.S. Appl. No. 16/172,253, mailed on May 20, 2020.
Notice of Allowance for U.S. Appl. No. 16/172,253 Mailed on Oct. 26, 2020.
European Patent Application No. 20197019.1 entitled "A Recreational Vehicle User Interface" filed on Sep. 18, 2020.
European Patent Application No. 20197022.5 entitled "System and Method for Controlling at least one Function of a Vehicle" filed on Sep. 18, 2020.
European Patent Application No. 20197023.3 entitled "Devices and Method for Controlling at least one Function of a Vehicle" filed on Sep. 18, 2020.
Extended European Search Report for European Patent Application No. 20197019.1 mailed on Mar. 9, 2021.
Extended European Search Report for European Patent Application No. 20197022.5 mailed on Mar. 4, 2021.
Extended European Search Report for European Patent Application No. 20197023.3 mailed on Feb. 16, 2021.
U.S. Appl. No. 29/641,674, filed Mar. 23, 2018 titled "Control Panel".
U.S. Appl. No. 29/767,088, filed Jan. 20, 2021 titled "Control Panel".

(56) References Cited

OTHER PUBLICATIONS

U.S. Appl. No. 29/683,099, filed Mar. 11, 2019 titled Controller.
European Design Application No. 008053383-0001-0003 filed on Jul. 24, 2020.
Non Final office Action Issued in U.S. Appl. No. 16/641,581, mailed on Jun. 18, 2021.
Notice of Allowance for U.S. Appl. No. 16/641,581 Mailed on Oct. 6, 2021.
International Search Report and Written Opinion Issued in PCT Application No. PCT/EP2021/075391 mailed on Nov. 9, 2021.
International Search Report Issued in PCT Application No. PCT/EP2021/075390 mailed on Dec. 20, 2021.
U.S. Appl. No. 17/673,080 titled "Recreational Vehicle, Cooling Device, Controlling System and Method for Controlling the Cooling Device" filed on Feb. 16, 2022.
PCT Application No. PCT/EP2022/056369 titled "Improved Use of Minibar Sensors" filed on Mar. 11, 2022.
Corrected Notice of Allowance Issued in U.S. Appl. No. 16/641,581 mailed on Jan. 14, 2022.
AU Application No. 2021343247 titled "A Recreational Vehicle User Interface" filed on Mar. 13, 2023.
U.S. Appl. No. 18/245,321 titled "System and Method for Controlling At Least One Function of a Recreational Vehicle" filed on Mar. 14, 2023.
U.S. Appl. No. 18/245,322 titled "Devices and Methods for Securing Communication Between a Sensor and a Device" filed on Mar. 14, 2023.
PCT Application No. PCT/EP2022/068965 titled "Minibar Communication" filed on Jul. 7, 2022.
International Search Report and Written Opinion issued in PCT Application No. PCT/EP2022/068965 mailed on Feb. 21, 2023.
PCT Application No. PCT/EP2022/068968 titled "Minibar Operation" filed on Jul. 7, 2022.
International Search Report and Written Opinion issued in PCT Application No. PCT/EP2022/068968 mailed on Feb. 20, 2023.
PCT Application No. PCT/EP2022/068970 titled "Initialisation of a Communication Device for a Minibar" filed on Jul. 7, 2022.
International Search Report and Written Opinion issued in PCT Application No. PCT/EP2022/068970 mailed on Feb. 1, 2023.
International Search Report and Written Opinion issued in PCT Application No. PCT/EP2022/056369 mailed on Nov. 9, 2022.

* cited by examiner

SYSTEM AND METHOD FOR CONTROLLING AT LEAST ONE FUNCTION OF A RECREATIONAL VEHICLE

CROSS REFERENCE TO RELATED APPLICATIONS

This 35 U.S.C. § 371 National Stage Patent application claims priority to and benefit of PCT Patent Application No. PCT/EP2021/075390, filed Sep. 15, 2021, which claims priority to and benefit of EP 20197022.5, filed Sep. 18, 2020, all of which is incorporated herewith.

TECHNICAL FIELD

The present disclosure relates to the field of vehicles and, in particular, recreational vehicles (RVs) or recreational vessels. More specifically, the present disclosure relates to a system as well as a method for controlling at least one function of a vehicle.

BACKGROUND

A general definition of a vehicle is a machine that transports people, or cargo, from one location to another. However, in recent years, the development of vehicles, and their functions, has been intense. Nowadays, a vehicle is so much more than just a transportation device. A vehicle is a comfortable transportation machine, which may be practical, enjoyable and comfortable to drive and which may be used for other purposes than just transportation. A vehicle may be used for recreation and even with the purpose of accommodation. With the expansion of the area of use for vehicles, the number of functions within the vehicles have increased. The vehicles are becoming more and more complex, including more and more functions. Functions of the vehicles may include, without limitation, HVAC (Heat, Ventilation and Air-Conditioning) related functions, security alarm functions, light control functions, etc.

When a function within a vehicle is controlled, a parameter within the physical environment of the vehicle may be affected. The affected, or changed, parameter may be some type of input within the physical environment that may be detected, or measured, by a sensor. The input may be any one of a great number of environmental phenomena and may be, for example, light, temperature, speed, distance, moisture and pressure. Generally, the sensor converts the detected, or measured, input to an electronic signal. The electronic signal may be converted into human-readable information at the sensor location or transmitted electronically over a network for reading or further processing at a distant location.

With decreased costs for sensors, sensors are used more and more to receive information that otherwise would have been unknown. By using sensors in vehicles, it may be possible for a user to view a resulting parameter when controlling a function of the vehicle. The resulting parameter is thus the result of the controlled function. However, if the resulting parameter is not the desired result, the user may have to control the function once again in order to achieve a more desirable result. This may be time consuming and it may be difficult to arrive at the desired result. The user may be overwhelmed with information and it may take a long time before the user learns how to control a certain function in order to achieve a certain result. Thus, the use of sensors in vehicles may not be the relief that it is intended to be.

SUMMARY

In order to achieve a better and more precise way of controlling functions of vehicles, the inventors of the various embodiments have realized, after inventive and insightful reasoning, that with the introduction of a plurality of sensors into vehicles, the possibilities for how functions of the vehicles may be controlled have expanded. By utilizing and combining knowledge from a plurality of different sources and comparing this information against known policies, categories or derived information, the functions of the vehicles may be controlled in an improved way.

In view of the above, it is therefore a general object of the aspects and embodiments described throughout this disclosure to provide a more time efficient and accurate method and monitoring and control system for controlling functions of vehicles in an improved way.

This general object has been addressed by the appended independent claims. Advantageous embodiments are defined in the appended dependent claims.

According to a first aspect, there is provided a vehicle monitoring and control system for controlling at least one function of a vehicle. According to one advantageous embodiment, the vehicle may be a Recreational Vehicle (RV). According to another embodiment, the vehicle may be a recreational vessel.

In one exemplary embodiment, the vehicle monitoring and control system comprises at least one controller. The at least one controller is configured to receive sensor input data from at least two different types of sensor units and to process the received sensor input data into a combined sensor input data. The combined sensor input data is compared against at least one threshold. Based on a result of the comparison, at least one function of the vehicle is controlled.

In some embodiments, the at least one controller is configured to, when the combined sensor input data is above at least one of said at least one threshold, control said at least one function of the vehicle in one way. When the combined sensor input data is below said one of said at least one threshold, the at least one controller is configured to control the corresponding at least one function of the vehicle in a different way.

In other embodiments, the at least one controller is configured to, when the combined sensor input data is above at least one of said at least one threshold, control the at least one function of the vehicle. Alternatively, when the combined sensor input data is below said one of said at least one threshold, the at least one controller is configured control the at least one function of the vehicle.

In some embodiments, the combined sensor input data is compared against multiple thresholds. Then, the at least one controller is configured to, when the combined sensor input data is between a lower and a higher of said multiple thresholds, control the at least one function of the vehicle in one way. When the combined sensor input data is not between the lower and the higher of said multiple thresholds, the at least one controller is configured to control the at least one function of the vehicle in a different way.

In some embodiments, the received sensor input data comprises at least one of temperature data, humidity data, barometric pressure data, light intensity data, air quality data, smoke detection data, gas level data, water level data, accelerometer data, passive IR data, proximity data, location data and virtual sensor data deducted from sensor data.

In some embodiments, the at least one function of the vehicle includes any one or a combination of: a ventilation function, a heater function, a climate control function, a water heater function, a vehicle battery management function, a light control function and a security alarm function.

In some embodiments, the vehicle monitoring and control system further comprises a user interface configured to display at least one of: the received sensor input data, the combined sensor input data, at least one of the controllable functions of the vehicle and the at least one function to be controlled based on the comparison of the combined sensor input data against the at least one threshold. The user interface may further be configured to receive user input from a user during the user's operation and interaction with said user interface, and to control at least one function of the vehicle based on said received user input.

In some embodiments, the at least one controller is configured to control the at least one function of the vehicle by transmitting a control command to a device which is in control of the at least one function to be controlled.

According to a second aspect, there is provided a method implemented by the vehicle monitoring and control system according to the first aspect.

In one exemplary embodiment, the method comprises receiving sensor input data from at least two different types of sensor units and processing the received sensor input data into a combined sensor input data. The combined sensor input data is compared against a threshold and based on a result of the comparison, at least one function of the vehicle is controlled.

In some embodiments, the method comprises, when the combined sensor input data is above one of said at least one threshold, controlling the at least one function of the vehicle in one way, and when the combined sensor input data is below said one of said at least one threshold, controlling the corresponding at least one function of the vehicle in a different way.

In other embodiments, the method comprises, when the combined sensor input data is above one of said at least one threshold, controlling the at least one function of the vehicle, or when the combined sensor input data is below said one of said at least one threshold, controlling the at least one function of the vehicle.

In some embodiments, the combined sensor input data is compared against multiple thresholds. In these embodiments, the method comprises, when the combined sensor input data is between a lower and a higher of said multiple thresholds, controlling the at least one function of the vehicle in one way, and when the combined sensor input data is not between the lower and the higher of said multiple thresholds, controlling the at least one function of the vehicle in a different way.

In some embodiments, the received sensor input data comprises at least one of temperature data, humidity data, barometric pressure data, light intensity data, air quality data, smoke detection data, gas level data, water level data, accelerometer data, passive IR data, proximity data, location data and virtual sensor data deducted from sensor data.

In some embodiments, the at least one function of the vehicle includes any one or a combination of: a ventilation function, a heater function, a climate control function, a water heater function, a vehicle battery management function, a light control function and a security alarm function.

In some embodiments, the method further comprises displaying, at a user interface, at least one of: the received sensor input data, the combined sensor input data, the at least one function to be controlled based on the comparison of the combined sensor input data against the threshold and at least one of the controllable functions of the vehicle. The method may further comprise receiving user input from a user during the user's operation and interaction with said user interface; and controlling at least one function of the vehicle based on said received user input.

In some embodiments, the step of controlling the at least one function of the vehicle comprises transmitting a control command to a device which is in control of the at least one function to be controlled.

According to a third aspect of the present disclosure, the object is achieved by a computer program comprising instructions, which when executed by a processor, causes the processor to perform actions according to any of the methods according to the second aspect.

According to a fourth aspect of the present disclosure, the object is achieved by a carrier comprising the computer program of the third aspect, wherein the carrier is one of an electronic signal, an optical signal, an electromagnetic signal, a magnetic signal, an electric signal, a radio signal, a microwave signal, or a computer-readable storage medium.

Some of the above embodiments eliminate or at least reduce the problems discussed above. By combining sensor data from different types of sensor units, it is possible to consider several parameters when controlling a function of a vehicle. Thus, a method and a monitoring and control system are provided, which in a time efficient and accurate way control at least one function of the vehicle.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The disclosed embodiments will now be described more fully hereinafter with reference to the accompanying drawings, in which certain embodiments are shown. The embodiments may be provided in many different forms and should not be construed as limited to those set forth herein; rather, these embodiments are provided by way of example so that this disclosure will be thorough and complete, and will fully convey the scope of the claims to those skilled in the art. Like numbers refer to like elements throughout.

Figure 1A:
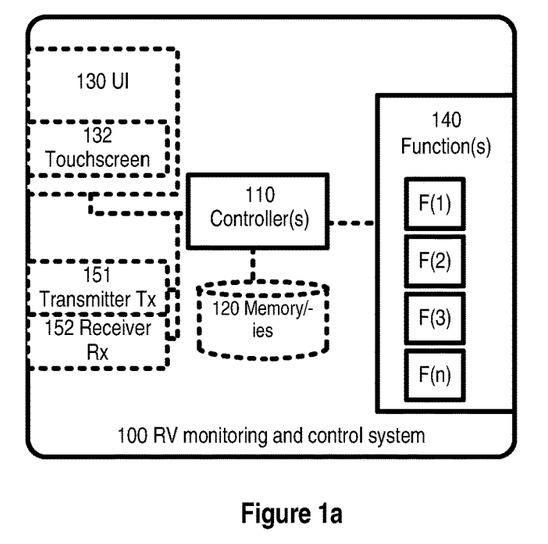
FIG. 1a is a schematic drawing illustrating a vehicle monitoring and control system according to embodiments herein.

In one of its aspects, the disclosure presented herein concerns a vehicle monitoring and control system for controlling at least one function of a vehicle. FIG. 1a is a schematic drawing illustrating a vehicle monitoring and control system 100 according to embodiments herein.

Figure 1B:
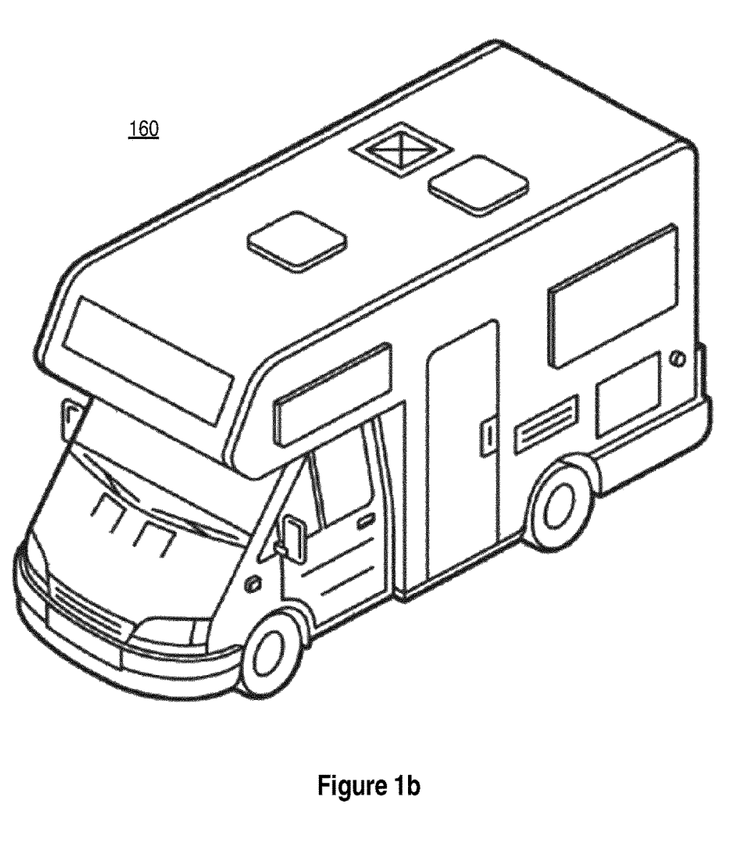
FIG. 1b shows an overview of a recreational vehicle.

An example of a vehicle, which may be used together with the present vehicle monitoring and control system 100, is a Recreational Vehicle (RV). An RV is a motor vehicle, or trailer, which includes living quarters designed for accommodation. RVs include, e.g., motorhomes, campervans, caravans—also known as travel trailers and camper trailers, fifth-wheel trailers, popup campers and truck campers. An overview of such an RV 160 is illustrated in FIG. 1*b*. As understood from the purpose of an RV 160, an RV 160 is a vehicle that includes many of the same functions as may be used in a house or an apartment. Thus, the vehicle monitoring and control system 100 presented herein may be advantageous to use with such a vehicle. Another example of a vehicle, which may be used together with the vehicle monitoring and control system 100, is a recreational vessel. Recreational vessels are vehicles that are used in water and mainly for recreational purposes. These vehicles may also have many functions similar to functions used in houses or apartments. The vehicle monitoring and control system 100 presented herein may be used to control at least one function of any vehicle, but may be advantageous to use together with any one of the previously described vehicles.

The vehicle, which functions may be controlled by the vehicle monitoring and control system 100, may in some embodiments be a complex vehicle, i.e. a vehicle with many functions 140 that may be controlled by the present vehicle monitoring and control system 100. However, the present vehicle monitoring and control system 100 may be used with any vehicle as long as there is at least one function 140 to be controlled in the vehicle and sensor input data may be received from a plurality of different types of sensors.

Figure 2A:
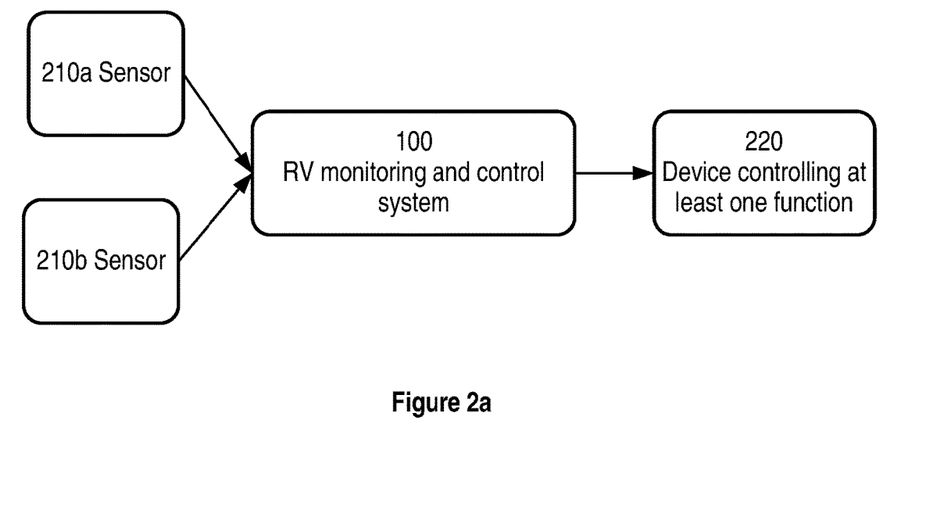
FIG. 2a is a schematic drawing according to an embodiment.
Figure 2B:
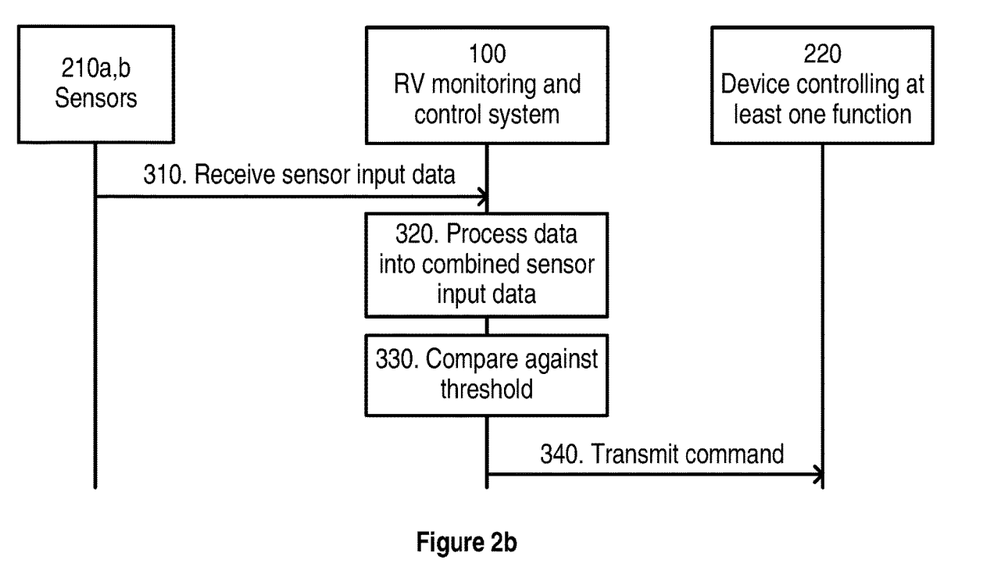
FIG. 2b is a signalling diagram according to an embodiment.

The vehicle monitoring and control system according to the present disclosure is now going to be described with reference to FIG. 1*a*, FIG. 2*a* and FIG. 2*b*. FIG. 1*a* is a schematic overview of the monitoring and control system 100 according to the present disclosure. FIG. 2*a* is schematic drawing according to the present disclosure and FIG. 2*b* is a signalling diagram according to the present disclosure. As seen in FIG. 1*a*, the vehicle monitoring and control system 100 comprises at least one controller 110. The at least one controller 110 may be embodied as software, e.g. in a cloud-based solution, or the at least one controller 110 may be embodied as a hardware controller. It may be implemented using any suitable, publicly available processor or Programmable Logic Circuit (PLC). The at least one controller 110 may be implemented using instructions that enable hardware functionality, for example, by using executable computer program instructions in a general-purpose or special-purpose processor that may be stored on a computer readable storage medium (disk, memory etc.) to be executed by such a processor. The controller 110 may be configured to read instructions from a memory 120 and execute these instructions to control at least one function of a vehicle. The memory 120 may be implemented using any commonly known technology for computer-readable memories such as ROM, RAM, SRAM, DRAM, FLASH, DDR, SDRAM or some other memory technology.

As illustrated in FIGS. 2*a* and 2*b*, the at least one controller 110 is configured to receive sensor input data from at least two different types of sensor units 210*a,b*. That the sensor units 210*a,b* are of different types means that the sensor units 210*a,b* are configured to measure, or detect, sensor input data of different types. Thus, the at least one controller 110 is configured to receive sensor input data of one kind from one of the at least two sensor units 210*a,b* and the at least one controller 110 is configured to receive sensor input data of a different type from another of the at least two sensor units 210*a,b*. For example, the at least one controller 110 may receive temperature data from one of the at least two sensor units 210*a,b* and humidity data from another of the at least two sensor units 210*a,b*. However, it may be appreciated that the sensor input data is not limited to these examples of sensor input data and may include almost any type of sensor input data. For example, the received sensor input data may comprise at least one of temperature data, humidity data, barometric pressure data, light intensity data, air quality data, smoke detection data, gas level data, water level data, accelerometer data, passive IR data, proximity data and location data. The sensor input data may additionally, or alternatively, comprise virtual sensor data deducted from sensor data. Virtual sensor data is data converted from several sensor units into valuable information, which cannot be attained from an only sensor unit.

The at least one controller 110 is further configured to process the received sensor input data into a combined sensor input data. Thus, the received sensor input data is processed such that the different types of sensor input data are related to each other. This may be performed in several different ways and may be dependent on the received type of sensor input data. According to a non-limiting example, one of the received sensor input data may be temperature data measured in e.g. Celsius, and another of the received sensor input data may be humidity data, i.e. the concentration of water vapor present in the air. These two types of sensor input data may be combined into a heat index, i.e. felt air temperature. As is known, a temperature of 30° C. in 40% humidity may feel as 29° C., while a temperature of 30° C. in 90% humidity may feel like 41° C. Thus, the combined sensor input data in this example represents a heat index, which is a combination of temperature data and humidity data. Other types of sensor input data that may be combined with each other are, for example, smoke detection data and light intensity data. These different types of sensor input data may be combined into a combined sensor input data, e.g. in order to evaluate a risk of a fire within the vehicle. Still other types of sensor input data that may be combined with each other are, for example, air quality data and temperature data to reflect air freshness; or proximity data, location data and accelerometer data to reflect the risk of an accident. Accordingly, there are several different possibilities of which sensor input data that may be combined with each other.

Depending on the types of received sensor input data, the data may be combined into a combined sensor input data in different ways. The different types of sensor input data may be added to each other, subtracted, multiplied or divided, all depending on how the two different types of sensor input data should be related to each other. In addition to this, in some embodiments, a weight may be added to one, some or to each, of the received sensor input data. The weight may determine how one type of sensor input data should be weighed against another type of sensor data. For example, the type of sensor input data that is of most important for the function to be controlled, may be awarded a higher weight, while the other types of sensor input data may be awarded lower weights, or no weight. By adding a weight to at least one of the sensor input data, it may be assured that at least one type of sensor input data is awarded a higher, or lower, significance for the function 140 to be controlled by the vehicle monitoring and control system 100. In other embodiments, the sensor input data may be combined with each other based on information derived from the received sensor input data. An example of such derived information may be rate of change, i.e. how quickly a sensor input data is changing.

When the received sensor input data have been combined into a combined sensor input data, the combined sensor input data is compared against at least one threshold. Based on the comparison, at least one function 140 of the vehicle is controlled. By comparing the combined sensor input data against at least one threshold, it may be determined how the received sensor data is related to a certain reference value.

Based on the relation between the combined sensor input data and the threshold, it may be determined if at least one function 140 of the vehicle should be controlled and if so, which functions 140 that should be controlled and how they should be controlled. In other words, depending on the result of the comparison of the combined sensor input data against the at least one threshold, different actions may be taken. This makes it possible to take a plurality of parameters into account before controlling at least one function 140 of a vehicle. This will result in that functions 140 of the vehicle may be controlled in an improved way. A user does not have to spend a lot of time trying to control different functions 140 of the vehicle in order to reach a certain result. Instead, the monitoring and control system 100 takes received sensor input data that may be related to the functions 140 and combines them into a combined input in a time efficient way. Thereafter, the monitoring and control system 100 compares the combined result against a reference value to determine which functions 140, and how the functions 140, should be controlled in order to achieve the desired result. Thus, the present disclosure provides a monitoring and control system 100, which in a time efficient and accurate way controls at least one function 140 of a vehicle.

The at least one threshold used for comparison with the combined sensor input data may be set by from start as a default setting when configuring the vehicle monitoring and control system 100. Alternatively, the at least one threshold may be set by a user. The user may be a user of the vehicle that is connected with the vehicle monitoring and control system 100. In some embodiments, after the initial set of the at least one threshold, the threshold may be possible to change, or update. The update may be performed automatically by the at least one controller 110 of the vehicle monitoring and control system 100 or manually by a user. In case the at least one threshold is updated automatically, this may e.g. be performed by a machine learning algorithm. The machine learning algorithm may learn at which values the at least one threshold may be optimal when controlling at least one function 140 of the vehicle. By following the received sensor input data's relation to the at least one function 140 to be controlled and the data's dependencies to each other, the machine learning algorithm may find that a threshold may benefit from being updated. For example, if it is detected that a certain combined sensor input data always seems to result in a manual command for controlling one of the at least one function 140, this may indicate that the at least one threshold for this function should be adjusted. This may indicate that the function 140 is controlled before the combined sensor input data reaches the threshold and before the function 140 will be controlled automatically by the vehicle monitoring and control system 100. For example, if a specific user always seems to manually control a function 140 of the vehicle for decreasing a temperature and this is performed before the vehicle monitoring and control system 100 has reacted to the combined sensor input data related to this function 140, this may indicate that the threshold has to be updated. This indicates that the threshold related to the heat index should be lowered, such that the user does not have to control this function 140 manually. The vehicle monitoring and control system 100 may thus have noticed that the specific heat index-threshold is set too high for the specific user of the vehicle. Accordingly, the machine learning algorithm may determine that the at least one threshold should be adjusted to better achieve a desired result, which will improve the functioning of the monitoring and control system 100. By studying all manual commands in the monitoring and control system 100, a machine learning algorithm may learn how to set, and adjust, different thresholds used with the system 100.

According to some embodiments, the at least one threshold may comprise one threshold, i.e. a reference value which sets a threshold of when and how the at least one function 140 should be controlled by the vehicle monitoring and control system 100. In one example embodiment, the at least two different types of sensor input data may be combined with each other to reflect how close the different types, or categories, of sensor input data are to each other. In such embodiment, the sensor input data may be subtracted from each other. The difference between the categories may reflect how close they are to each other in the n-dimensions. For example, if they are too close to each other, i.e. the difference is below the threshold, this indicates that at least one function 140 should be controlled. In another example embodiment, the combined sensor input data may reflect the speed at which the received sensor input data are changing. For example, if it changes too quickly, i.e. quicker than allowed and with a velocity that is above the at least one threshold, the at least one function 140 should be controlled by the vehicle monitoring and control system 100.

According to some embodiments, the at least one threshold may comprise a plurality of thresholds. The combined sensor input data may thus be above, below or in between the different thresholds. In such embodiments, the combined sensor input data may be compared against policies, i.e. against values within certain ranges. Different actions may be taken depending on within which range the combined sensor input data is located, i.e. the relation between the combined sensor input data and any of the thresholds.

As illustrated in FIGS. 2a and 2b, the at least one controller 110 may be configured to control the at least one function 140 of the vehicle by transmitting a control command to a device 220 which is in control of the at least one function 140 to be controlled by the system 100. The at least one function 140 of the vehicle that may be controlled by the monitoring and control system 100 may include any one or a combination of a ventilation function, a heater function, a climate control function, a water heater function, a vehicle battery management function, a light control function and a security alarm function. Thus, depending on the functions 140 to be controlled, the device 220 which is in control of the at least one function 140 may differ. For example, a heater device may control the heater function; a controller configured to control a security alarm may control the security alarm function etc. In some embodiments, the device 220 that is on control of the at least one function 140 may be the same device as the at least one controller 110 of the vehicle monitoring and control system 100. In other embodiments, the device 220 that is in control of the at least one function 140 may be a separate device from the at least one controller 110. In such embodiments, the control command may be transmitted using a receiver 152 of the vehicle monitoring and control system 100.

According to one embodiment, if the combined sensor input data is above at least one of said at least one threshold, the at least one function 140 of the vehicle may be controlled in one way. According to the same embodiment, if the combined sensor input data instead is below the same one of said at least one threshold, the at least one function 140 of the vehicle may be controlled in a different way. For example, if the combined sensor input data reflects a heat index that is above a certain value, this may cause that at least one of a ventilation function and a climate control function is controlled by the monitoring and control system 100. These functions 140 may be used to bring down the heat index, such that a perceived temperature may be lower. However, if the combined sensor input data instead is below the same one of said at least one threshold, the corresponding at least one function 140 of the vehicle, i.e. at least one of the ventilation function and the climate control function, may be used to bring up the heat index. Thus, how the at least one function 140 of the vehicle may be controlled may be determined in dependence of the comparison of the combined sensor input data against the at least one threshold.

In embodiments where the at least one threshold comprises a plurality of thresholds, the at least one function 140 of the vehicle may be controlled in one way if the combined sensor input data is above at least one of the thresholds, i.e. as long as the combined sensor input data is above a minimum threshold. If the combined sensor input data instead is below this threshold, the function 140 may be controlled in a different way. In some of these embodiments, the at least one function 140 may be controlled in a first way if the combined sensor input data is above the highest of said plurality of thresholds and in a second way if the combined sensor input data is below the highest threshold. In still other embodiments, the at least one function 140 may be controlled in a first way if it is above a highest threshold. The at least one function 140 may be controlled in a second way if it is below the highest threshold, but still above a lower threshold, i.e. if the combined sensor input data is between a higher and a lower threshold, i.e. within a certain interval. The at least one function 140 may be controlled in a third way if it is below this lower threshold. By introducing several thresholds, it may be possible to control the at least one function 140 differently depending on in which interval the combined sensor input data is located. Thus, by using several thresholds the monitoring and control system 100 may be more sensitive and may be fine-tuned.

According to another embodiment, the at least one controller 110 may be configured to only control the at least one function 140 of the vehicle if the combined sensor input data is above at least one of said at least one threshold. Alternatively, the at least one controller 110 may be configured to control the at least one function 140 of the vehicle if the combined sensor input data is below at least one of said at least one threshold. Thus, by only controlling the at least one function 140 if it is below (or above—depending on the function 140 to be controlled) the at least one threshold, the at least one function 140 may only be controlled if the combined sensor input data is below, or above, a critical value. For example, if the combined sensor input data comprises temperature data, air quality data and smoke detection data, this data may indicate whether a fire is ongoing in the vehicle. The at least one function 140 to be controlled may then be a security alarm function and/or a water extinguishing function. These functions 140 should only be controlled if the combined sensor input data indicates that a fire is ongoing, e.g. if the combined sensor input data is above a threshold. The functions should not be activated, or controlled, if the combined sensor input data does not indicate a fire, e.g. if the combined sensor input data is below a threshold.

The embodiment described above may also comprise a plurality of thresholds, where each of the different thresholds may indicate a course of the fire. Depending on which of the plurality of thresholds that the combined sensor input data is above, different functions 140 may be controlled. For example, a combined sensor input data above a lower of said plurality of thresholds may indicate that the fire has just started. This may trigger that the security alarm function should be started and controlled by the vehicle monitoring and control system 100. However, if the combined sensor input data is above a higher of said plurality of thresholds, this may indicate that the fire has been ongoing for a while, and that both a security alarm function and a water extinguishing function should be started and controlled by the vehicle monitoring and control system 100. Thus, by using a plurality of thresholds, this may indicate different states of a certain event, which may trigger more and more, or different, functions 140.

As also illustrated in FIG. 1a, in some embodiments, the vehicle monitoring and control system 100 may further comprise a user interface 130. The user interface 130 may be configured to display information to a user of the vehicle monitoring and control system 100. The user interface 130 may be configured to display at least one of the received sensor input data, the combined sensor input data, the at least one function 140 that may be controlled by the system 100 and the at least one function 140 to be controlled based on the comparison of the combined sensor input data against the threshold. Thus, a user of the vehicle may view information about the vehicle related to the information received from the at least two sensor units 210a,b. By providing a user interface 130, it may be easier for a user of the vehicle to study the vehicle, its functions 140 and to understand what is happening within the monitoring and control system 100.

The user interface 130 may further be configured to receive user input from a user during the user's operation and interaction with said user interface 130, and to control at least one function 140 of the vehicle based on said received user input. Accordingly, in some embodiments, a user of the user interface 130 may provide input to the vehicle monitoring and control system 100. For example, the user may set, or change the at least one threshold that the combined sensor input data should be compared against. A user may perceive that a function 140 is started too easily by the vehicle monitoring and control system 100 and may thus provide a new threshold that may be, e.g. higher. By giving the user an opportunity to provide input to the monitoring and control system 100, the system 100 may take parameters into account that would otherwise not have been considered.

The user interface 130 may be located together with the at least one controller 110, i.e. in a same physical apparatus, but it may be appreciated that the at least one controller 110 and the user interface 130 may be located separately and that they may be configured to transmit and receive data to and from each other.

In another aspect, the disclosure presented herein concerns a method implemented in a vehicle monitoring and control system 100 for controlling at least one function 140 of a vehicle. The vehicle may be any vehicle that comprises at least two types of sensor units 210a,b configured to receive sensor input data. In some embodiments, the vehicle comprises an RV or a recreational vessel.

Figure 3:
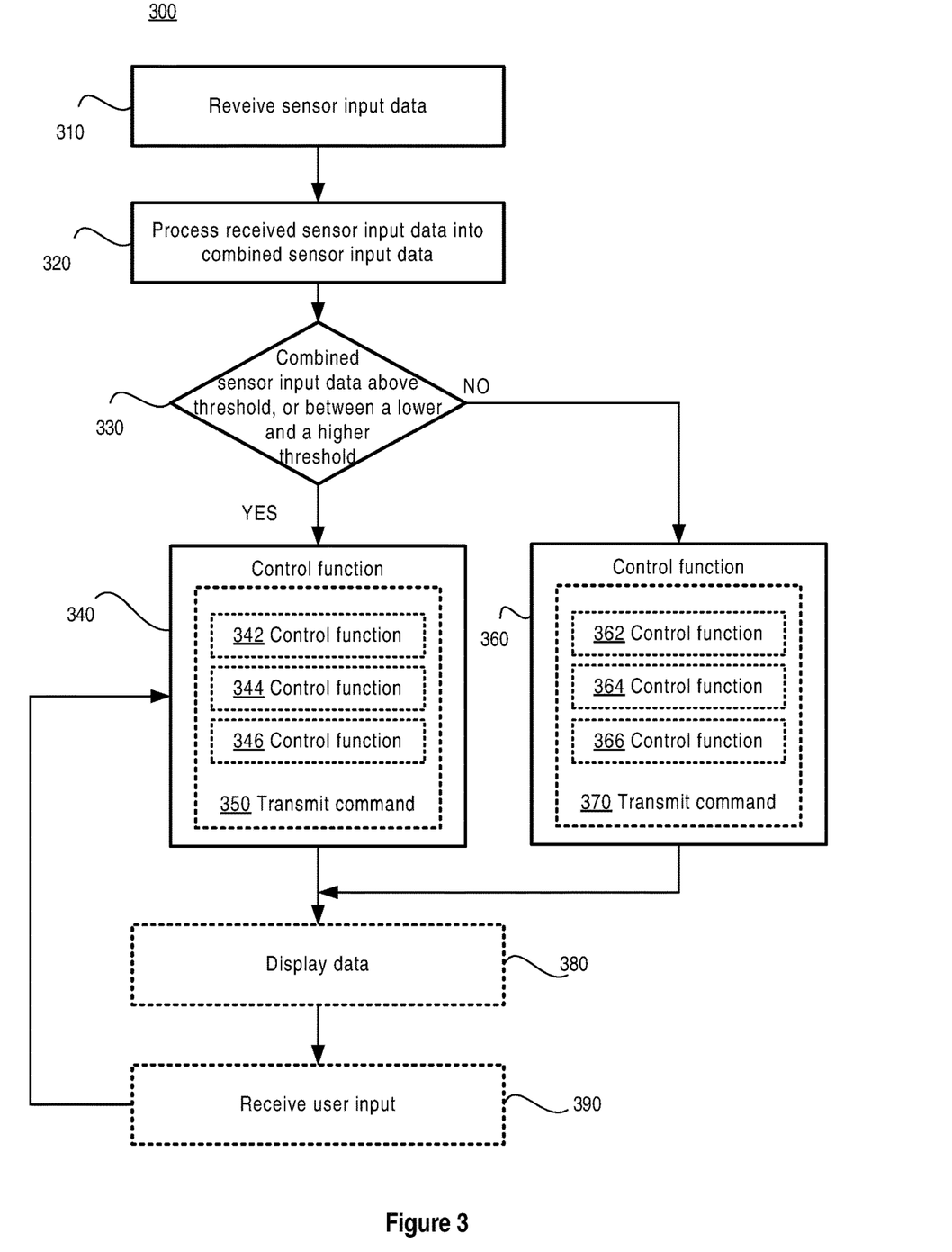
FIG. 3 shows a flowchart of an example method performed by a system.

The method presented herein is now going to be described with reference to FIG. 2b and FIG. 3. FIG. 3 shows a flowchart of an example method 300 performed by the monitoring and control system 100. As seen in FIG. 3, the method 300 starts with step 310 of receiving sensor input data from at least two different types of sensor units 210a,b. This is also illustrated in FIG. 2b. The received sensor input data is processed into a combined sensor input data in step 320. Thereafter, the combined sensor input data is compared against a threshold in step 330. Based on a result of the comparison, the method 300 further comprises step 340 of controlling at least one function 140 of the vehicle. The presented method 300 makes it is possible to consider several parameters when controlling a function of a vehicle. Thus, a method 300 is provided, which in a time efficient and accurate way control at least one function of a vehicle.

As seen in FIG. 3, in some embodiments, when the combined sensor input data is above the at least one threshold, the method 300 may comprise step 342 of controlling the at least one function 140 of the vehicle in one way. When the combined sensor input data is below the at least one threshold, method 300 may comprise step 362 of controlling the corresponding at least one function 140 of the vehicle in a different way.

In other embodiments, when the combined sensor input data is above the at least one threshold, the method 300 may comprise step 344 of controlling the at least one function 140 of the vehicle. Alternatively, when the combined sensor input data is below the at least one threshold, the method 300 may comprise step 364 of controlling the at least one function 140 of the vehicle.

In some embodiments, the combined sensor input data may be compared against multiple thresholds, the method 300 may then comprise, when the combined sensor input data is between a lower and a higher of said multiple thresholds, the step 246 of controlling the at least one function 140 of the vehicle in one way. When the combined sensor input data is not between the lower and the higher of said multiple thresholds, the method 300 may comprise step 366 of controlling the at least one function 140 of the vehicle in a different way.

In some embodiments, the method 300 may further comprise step 380 of displaying, at a user interface 130, at least one of the received sensor input data, the combined sensor input data, the at least one function 140 to be controlled based on the comparison of the combined sensor input data against the threshold and at least one of the controllable functions 140 of the vehicle. The method 300 may further comprise step 390 of receiving user input from a user during the user's operation and interaction with said user interface 130. Based on said received user input, the method 300 may further comprise step 340, 360 of controlling at least one function 140 of the vehicle.

In some embodiments, the step of controlling 340,360 the at least one function 140 of the vehicle may comprise step 350,370 of transmitting a control command to a device 220 which is in control of the at least one function 140 to be controlled.

In another aspect, the disclosure presented herein concerns a computer program comprising instructions, which when executed by a processor, causes the processor to perform actions according to any of the methods described with reference to FIG. 3.

In another aspect, the disclosure presented herein concerns a carrier comprising the computer program of the previously described aspect, wherein the carrier is one of an electronic signal, an optical signal, an electromagnetic signal, a magnetic signal, an electric signal, a radio signal, a microwave signal, or a computer-readable storage medium.

Figure 4:
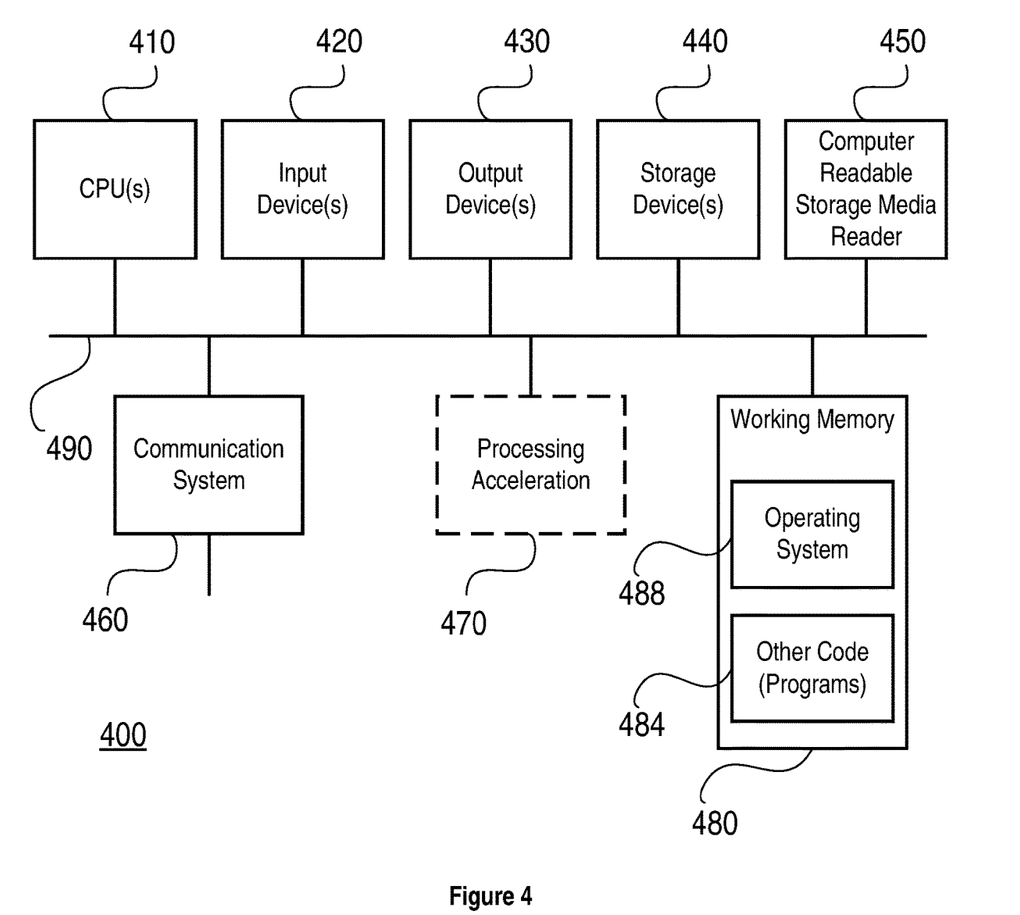
FIG. 4 shows a schematic view of a computer system.

FIG. 4 is a block diagram illustrating an exemplary computer system 400 in which embodiments may be implemented. This example illustrates a computer system 400 such as may be used, in whole, in part, or with various modifications, to provide the functions of the disclosed system 100. For example, various functions may be controlled by the computer system 400, including, merely by way of example, receiving sensor input data, processing the sensor input data into a combined sensor input data, comparing the result against at least one threshold and based on the result of the comparison, controlling at least one function 140 of the vehicle.

The computer system 400 is shown comprising hardware elements that may be electrically coupled via a bus 490. The hardware elements may include one or more central processing units 410, such as the at least one controller 110, one or more input devices 420 (e.g., a mouse, a keyboard, etc.), and one or more output devices 430 (e.g., a display device, a printer, etc.). The computer system 400 may also include one or more storage device 440. By way of example, the storage device(s) 440 may be disk drives, optical storage devices, solid-state storage device such as a random-access memory ("RAM") and/or a read-only memory ("ROM"), which can be programmable, flash-updateable and/or the like.

The computer system 400 may additionally include a computer-readable storage media reader 450, a communications system 460 (e.g., a modem, a network card (wireless or wired), an infrared communication device, Bluetooth™ device, cellular communication device, etc.), and a working memory 480, which may include RAM and ROM devices as described above. In some embodiments, the computer system 400 may also include a processing acceleration unit 470, which can include a digital signal processor, a special-purpose processor and/or the like.

The computer-readable storage media reader 450 can further be connected to a computer-readable storage medium, together (and, optionally, in combination with the storage device(s) 440) comprehensively representing remote, local, fixed, and/or removable storage devices plus storage media for temporarily and/or more permanently containing computer-readable information. The communications system 460 may permit data to be exchanged with a network, system, computer and/or other component described above.

The computer system 400 may also comprise software elements, shown as being currently located within the working memory 480, including an operating system 488 and/or other code 484. It should be appreciated that alternative embodiments of a computer system 400 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of the computer system 400 may include code 484 for implementing any or all of the function of the various elements of the architecture as described herein. For example, software, stored on and/or executed by a computer system such as the system 400, can provide the functions of the disclosed system. Methods implementable by software on some of these components have been discussed above in more detail.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

NUMBERED EXAMPLE EMBODIMENTS

The technology described throughout this disclosure thus encompasses without limitation the following numbered example embodiments:

NEE1. A vehicle monitoring and control system (100) for controlling at least one function (140) of a vehicle, the vehicle monitoring and control system (100) comprising at least one controller (110), wherein the at least one controller (110) is configured to:
  receive sensor input data from at least two different types of sensor units (210a,b);
  process the received sensor input data into a combined sensor input data;
  compare the combined sensor input data against at least one threshold; and
  based on a result of the comparison, control at least one function (140) of the vehicle.

NEE2. The vehicle monitoring and control system (100) according to embodiment NEE1, wherein the at least one controller (110) is configured to:
  when the combined sensor input data is above at least one of said at least one threshold, control the at least one function (140) of the vehicle in one way, and
  when the combined sensor input data is below said at least one of said at least one threshold, control the corresponding at least one function (140) of the vehicle in a different way.

NEE3. The vehicle monitoring and control system (100) according to embodiment NEE1, wherein the at least one controller (110) is configured to:
  when the combined sensor input data is above at least one of said at least one threshold, control the at least one function (140) of the vehicle, or
  when the combined sensor input data is below said at least one of said at least one threshold, control the at least one function (140) of the vehicle.

NEE4. The vehicle monitoring and control system (100) according to any of embodiments NEE1 to NEE3, wherein the combined sensor input data is compared against multiple thresholds and wherein the at least one controller (110) is configured to:
  when the combined sensor input data is between a lower and a higher of said multiple thresholds, control the at least one function (140) of the vehicle in one way, and
  when the combined sensor input data is not between the lower and the higher of said multiple thresholds, control the at least one function (140) of the vehicle in a different way.

NEE5. The vehicle monitoring and control system (100) according to any of embodiments NEE1 to NEE4, wherein the received sensor input data comprises at least one of temperature data, humidity data, barometric pressure data, light intensity data, air quality data, smoke detection data, gas level data, water level data, accelerometer data, passive IR data, proximity data, location data and virtual sensor data deducted from sensor data.

NEE6. The vehicle monitoring and control system (100) according to any one of embodiments NEE1 to NEE5, wherein the at least one function (140) of the vehicle includes any one or a combination of: a ventilation function, a heater function, a climate control function, a water heater function, a vehicle battery management function, a light control function and a security alarm function.

NEE7. The vehicle monitoring and control system (100) according to any of embodiments NEE1 to NEE6, wherein the vehicle monitoring and control system (100) further comprises a user interface (130) configured to display at least one of: the received sensor input data, the combined sensor input data, the at least one function (140) to be controlled based on the comparison of the combined sensor input data against the at least one threshold and at least one of the controllable functions (140) of the vehicle.

NEE8. The vehicle monitoring and control system (100) according to any of embodiments NEE1 to NEE7, wherein the user interface (130) further is configured to receive user input from a user during the user's operation and interaction with said user interface (130), and to control at least one function (140) of the vehicle based on said received user input.

NEE9. The vehicle monitoring and control system (100) according to any of embodiments NEE1 to NEE8, wherein the at least one controller (110) is configured to control the at least one function (140) of the vehicle by transmitting a control command to a device (220) which is in control of the at least one function (140) to be controlled.

NEE10. A method (300) implemented in a vehicle monitoring and control system (100) for controlling at least one function (140) of a vehicle, the method (300) comprising:
  receiving (310) sensor input data from at least two different types of sensor units (210a,b);
  processing (320) the received sensor input data into a combined sensor input data;
  comparing (330) the combined sensor input data against at least one threshold; and
  based on a result of the comparison, controlling (340,360) at least one function (140) of the vehicle.

NEE11. The method (300) according to embodiment NEE10, wherein the method (300) comprises:
  when the combined sensor input data is above at least one of said at least one threshold, controlling (342) the at least one function (140) of the vehicle in one way, and
  when the combined sensor input data is below said at least one of said at least one threshold, controlling (362) the corresponding at least one function (140) of the vehicle in a different way.

NEE12. The method (300) according to embodiment NEE10, wherein the method (300) comprises:
  when the combined sensor input data is above at least one of said at least one threshold, controlling (344) the at least one function (140) of the vehicle, or
  when the combined sensor input data is below said at least one of said at least one threshold, controlling (364) the at least one function (140) of the vehicle.

NEE13. The method (300) according to any of embodiments NEE10 to NEE12, wherein the combined sensor input data is compared against multiple thresholds and wherein the method (300) comprises:
  when the combined sensor input data is between a lower and a higher of said multiple thresholds, controlling (346) the at least one function (140) of the vehicle in one way, and
  when the combined sensor input data is not between the lower and the higher of said multiple thresholds, controlling (366) the at least one function (140) of the vehicle in a different way.

NEE14. The method (300) according to any of embodiments NEE10 to NEE13, wherein the received sensor input data comprises at least one of temperature data, humidity data, barometric pressure data, light intensity data, air quality data, smoke detection data, gas level data, water level data, accelerometer data, passive IR data, proximity data, location data and virtual sensor data deducted from sensor data.

NEE15. The method (300) according to any one of embodiments NEE10 to NEE14, wherein the at least one function (140) of the vehicle includes any one or a combination of: a ventilation function, a heater function, a climate control function, a water heater function, a vehicle battery management function, a light control function and a security alarm function.

NEE16. The method (300) according to any of embodiments NEE10 to NEE15, wherein the method (300) further comprises:
 displaying (380), at a user interface (130), at least one of: the received sensor input data, the combined sensor input data, the at least one function (140) to be controlled based on the comparison of the combined sensor input data against the at least one threshold and at least one of the controllable functions (140) of the vehicle.

NEE17. The method (300) according to embodiment NEE16, wherein the method (300) further comprises:
 receiving (390) user input from a user during the user's operation and interaction with said user interface (130); and
 controlling (340,360) at least one function (140) of the vehicle based on said received user input.

NEE18. The method (300) according to any of embodiments NEE10 to NEE17, wherein the step of controlling (340,360) the at least one function (140) of the vehicle further comprises:
 transmitting (350,370) a control command to a device (220) which is in control of the at least one function (140) to be controlled.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A Recreational Vehicle (RV) monitoring and control system for controlling at least one function of a RV, the RV monitoring and control system comprising at least one controller, wherein the at least one controller is configured to:
 receive sensor input data from at least two different types of sensor units, whereby said different types of sensor units are configured to measure or otherwise detect sensor input data of different types;
 process the received sensor input data into a combined sensor input data;
 compare the combined sensor input data against at least one threshold; and
 based on a result of the comparison, control at least one function of the RV, wherein:
  the at least one controller is configured to control the at least one function of the RV by transmitting a control command to a device which is in control of the at least one function to be controlled, and
  determine that the at least one threshold should be updated based on a determination using a machine learning algorithm that the at least one function will be manually controlled before the combined sensor input data has reached the at least one threshold and automatically update the at least one threshold.

2. The RV monitoring and control system according to claim 1, wherein the at least one controller is configured to:
 when the combined sensor input data is above at least one of said at least one threshold, control the at least one function of the RV in one way, and
 when the combined sensor input data is below said at least one of said at least one threshold, control the corresponding at least one function of the RV in a different way.

3. The RV monitoring and control system according to claim 1, wherein the at least one controller is configured to:
 when the combined sensor input data is above at least one of said at least one threshold, control the at least one function of the RV, or
 when the combined sensor input data is below said at least one of said at least one threshold, control the at least one function of the RV.

4. The RV monitoring and control system according to claim 1, wherein the combined sensor input data is compared against multiple thresholds and wherein the at least one controller is configured to:
 when the combined sensor input data is between a lower and a higher of said multiple thresholds, control the at least one function of the RV in one way, and
 when the combined sensor input data is not between the lower and the higher of said multiple thresholds, control the at least one function of the RV in a different way.

5. The RV monitoring and control system according to claim 1, wherein the received sensor input data comprises at least one of temperature data, humidity data, barometric pressure data, light intensity data, air quality data, smoke detection data, gas level data, water level data, accelerometer data, passive IR data, proximity data, location data and virtual sensor data deducted from sensor data.

6. The RV monitoring and control system according to claim 1, wherein the at least one function of the RV includes any one or a combination of: a ventilation function, a heater function, a climate control function, a water heater function, a vehicle battery management function, a light control function and a security alarm function.

7. The RV monitoring and control system according to claim 1, wherein the RV monitoring and control system further comprises a user interface configured to display at least one of: the received sensor input data, the combined sensor input data, the at least one function to be controlled based on the comparison of the combined sensor input data against the at least one threshold and at least one of the controllable functions of the RV.

8. The RV monitoring and control system according to claim 1, comprising a user interface which is configured to receive user input from a user during a user's operation and interaction with said user interface, and to control at least one function of the RV based on said received user input.

9. A method implemented in a Recreational Vehicle (RV) monitoring and control system for controlling at least one function of a RV, the method comprising:
 receiving sensor input data from at least two different types of sensor units, whereby said different types of sensor units are configured to measure or otherwise detect sensor input data of different types;

processing the received sensor input data into a combined sensor input data;

comparing the combined sensor input data against at least one threshold;

based on a result of the comparison, controlling at least one function of the RV, wherein the step of controlling the at least one function of the RV further comprises transmitting a control command to a device which is in control of the at least one function to be controlled; and determining that the at least one threshold should be updated based on a determination using a machine learning algorithm that the at least one function will be manually controlled before the combined sensor input data has reached the at least one threshold and automatically update the at least one threshold.

10. The method according to claim 9, wherein the method comprises:

when the combined sensor input data is above at least one of said at least one threshold, controlling the at least one function of the RV in one way, and when the combined sensor input data is below said at least one of said at least one threshold, controlling the corresponding at least one function of the RV in a different way.

11. The method according to claim 9, wherein the method comprises:

when the combined sensor input data is above at least one of said at least one threshold, controlling the at least one function of the RV, or when the combined sensor input data is below said at least one of said at least one threshold, controlling the at least one function of the RV.

12. The method according to claim 9, wherein the combined sensor input data is compared against multiple thresholds and wherein the method comprises:

when the combined sensor input data is between a lower and a higher of said multiple thresholds, controlling the at least one function of the RV in one way, and when the combined sensor input data is not between the lower and the higher of said multiple thresholds, controlling the at least one function of the RV in a different way.

13. The method according to claim 9, wherein the received sensor input data comprises at least one of temperature data, humidity data, barometric pressure data, light intensity data, air quality data, smoke detection data, gas level data, water level data, accelerometer data, passive IR data, proximity data, location data and virtual sensor data deducted from sensor data.

14. The method according to claim 9, wherein the at least one function of the RV includes any one or a combination of: a ventilation function, a heater function, a climate control function, a water heater function, a vehicle battery management function, a light control function and a security alarm function.

15. The method according to claim 9, wherein the method further comprises:

displaying, at a user interface, at least one of: the received sensor input data, the combined sensor input data, the at least one function to be controlled based on the comparison of the combined sensor input data against the at least one threshold and at least one of the controllable functions of the RV.

16. The method according to claim 15, wherein the method further comprises:

receiving user input from a user during a user's operation and interaction with said user interface; and controlling at least one function of the RV based on said received user input.

\* \* \* \* \*